United States Patent
Duan

(10) Patent No.: US 9,559,390 B2
(45) Date of Patent: Jan. 31, 2017

(54) BATTERY DEGRADATION ACCUMULATION METHODS

(71) Applicant: Ford Global Technologies, LLC, Dearborn, MI (US)

(72) Inventor: Xiaohong Nina Duan, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 499 days.

(21) Appl. No.: 14/134,690

(22) Filed: Dec. 19, 2013

(65) Prior Publication Data

US 2015/0180090 A1     Jun. 25, 2015

(51) Int. Cl.
  *H01M 10/42*   (2006.01)
  *B60L 11/18*   (2006.01)
  (Continued)

(52) U.S. Cl.
  CPC ............ *H01M 10/425* (2013.01); *B60L 1/003* (2013.01); *B60L 1/06* (2013.01); *B60L 3/12* (2013.01); *B60L 7/14* (2013.01); *B60L 7/26* (2013.01); *B60L 11/14* (2013.01); *B60L 11/1816* (2013.01); *B60L 11/1857* (2013.01); *B60L 11/1861* (2013.01); *B60L 11/1864* (2013.01); *B60L 11/1868* (2013.01); *B60L 11/1877* (2013.01); *H01M 10/42* (2013.01); *H01M 10/48* (2013.01); *B60L 2210/10* (2013.01); *B60L 2210/30* (2013.01); *B60L 2210/40* (2013.01); *B60L 2240/545* (2013.01); *B60L 2240/547* (2013.01); *B60L 2240/549* (2013.01); *B60L 2240/80* (2013.01); *B60L 2260/44* (2013.01); *B60L 2260/50* (2013.01); *H01M 10/486* (2013.01);
(Continued)

(58) Field of Classification Search
  None
  See application file for complete search history.

(56) References Cited

U.S. PATENT DOCUMENTS

2010/0052617 A1* 3/2010 Aridome ............... B60L 3/0046
                                                        320/132
2010/0324846 A1* 12/2010 Marsh ................ G01R 31/3679
                                                        702/63
(Continued)

FOREIGN PATENT DOCUMENTS

JP    2003161768 A    6/2003
JP    2003243048 A    8/2003

*Primary Examiner* — Ula C Ruddock
*Assistant Examiner* — Matthew Van Oudenaren
(74) *Attorney, Agent, or Firm* — David B. Kelley; Brooks Kushman P.C.

(57) ABSTRACT

A vehicle includes a traction battery subject to alternating cycling and storage modes and a controller. The controller is programmed to calculate an accumulated degradation for the traction battery based on a degradation profile for the traction battery. The degradation profile defines degradation accumulated over time and may differ based on the mode and temperature. The initial degradation value includes the accumulated degradation for the present mode and at least a portion of the accumulated degradation for the other mode. Degradation is then accumulated according to the degradation profile starting from the initial degradation value. The amount of accumulated degradation from the other mode that is included may vary based on the mode and the accumulated degradation.

8 Claims, 6 Drawing Sheets

(51) Int. Cl.
- H01M 10/48 (2006.01)
- B60L 1/00 (2006.01)
- B60L 1/06 (2006.01)
- B60L 3/12 (2006.01)
- B60L 7/14 (2006.01)
- B60L 7/26 (2006.01)
- B60L 11/14 (2006.01)

(52) U.S. Cl.
CPC ........... *H01M 2220/20* (2013.01); *Y02T 10/70* (2013.01); *Y02T 10/7005* (2013.01); *Y02T 10/7044* (2013.01); *Y02T 10/7061* (2013.01); *Y02T 10/7066* (2013.01); *Y02T 10/7072* (2013.01); *Y02T 10/7077* (2013.01); *Y02T 10/7216* (2013.01); *Y02T 10/7241* (2013.01); *Y02T 90/127* (2013.01); *Y02T 90/14* (2013.01)

(56) References Cited

U.S. PATENT DOCUMENTS

| 2013/0282316 | A1* | 10/2013 | Goto | G01R 31/3679 |
|---|---|---|---|---|
| | | | | 702/63 |
| 2014/0107956 | A1* | 4/2014 | Miyaki | B60L 11/1857 |
| | | | | 702/63 |

* cited by examiner

BATTERY DEGRADATION ACCUMULATION METHODS

TECHNICAL FIELD

This disclosure relates generally to the estimation of degradation and useful life of a battery.

BACKGROUND

Modern hybrid and electric vehicles are highly dependent on a high voltage battery to provide energy to and store energy from an electric machine. The capability of a battery pack may become reduced over time. This reduction in capability may be the result of irreversible physical and chemical changes within the battery and may be a function of how the battery is operated and stored. These reductions in capability may result in the battery having less energy storage capacity and power than the battery might have had when new. Reductions in battery capability and power due to aging and operation may impact vehicle performance.

It may be desirable to estimate the remaining amount of useful life of the battery pack. Prediction of the degradation that a battery pack has experienced may allow a controller to modify the battery pack operating limits accordingly. Measuring the remaining life of a battery pack is useful during the design phase to ensure that a battery pack can meet specified requirements. In addition, measuring the remaining life of a battery pack may have useful service aspects. In general, knowledge of the remaining life of a battery pack during development and production may aid in reducing warranty costs and service issues.

SUMMARY

A vehicle includes a traction battery subject to alternating storage and cycling modes and at least one controller. The controller is programmed to operate the traction battery according to a parameter representing total degradation of the traction battery. In response to a transition between modes, the parameter increases in value according to a degradation profile associated with the present mode starting from an initial degradation value that depends on accumulated degradation for the prior mode. The vehicle degradation profile may define degradation accumulated over time. The initial degradation value may be a sum of accumulated degradation for the present mode and a fraction of accumulated degradation for the prior mode. The fraction may be different for the storage and cycling modes. The fraction may be based on the accumulated degradation for the present mode. The degradation profile may be traction battery temperature dependent. The parameter may increase when transitioning between modes. The parameter may increase periodically.

A method for estimating degradation of a battery subject to alternating storage and cycling modes includes, by at least one controller, increasing a parameter representing total degradation of the battery according to a degradation profile associated with the present mode starting from an initial degradation value that depends on accumulated degradation for the prior mode. The method further includes operating the battery according to the parameter representing total degradation. The initial degradation may be a sum of accumulated degradation for the present mode and a fraction of accumulated degradation for the prior mode. The fraction may be different for the storage and cycling modes. The fraction may be based on the accumulated degradation for the present mode. The method may further comprise displaying the parameter representing total degradation of the battery to an operator. The method may further comprise selecting the degradation profile associated with the present mode based on a temperature associated with the battery.

A vehicle includes a traction battery subject to varying temperature and at least one controller. The controller is programmed to operate the traction battery according to a degradation parameter that increases according to a temperature dependent degradation profile, wherein, upon switching from a first degradation profile to a second degradation profile due to a temperature change, a starting value on the second degradation profile is equal to an ending value on the first degradation profile. The temperature dependent degradation profile may define degradation accumulated over time for a plurality of traction battery temperatures. The ending value may be equal to the parameter representing total degradation. The parameter may increase when temperature changes. The parameter may increase periodically.

BRIEF DESCRIPTION OF THE DRAWINGS

FIG. 4b is a graph of the temperature versus time profile that corresponds to FIG. 4a.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
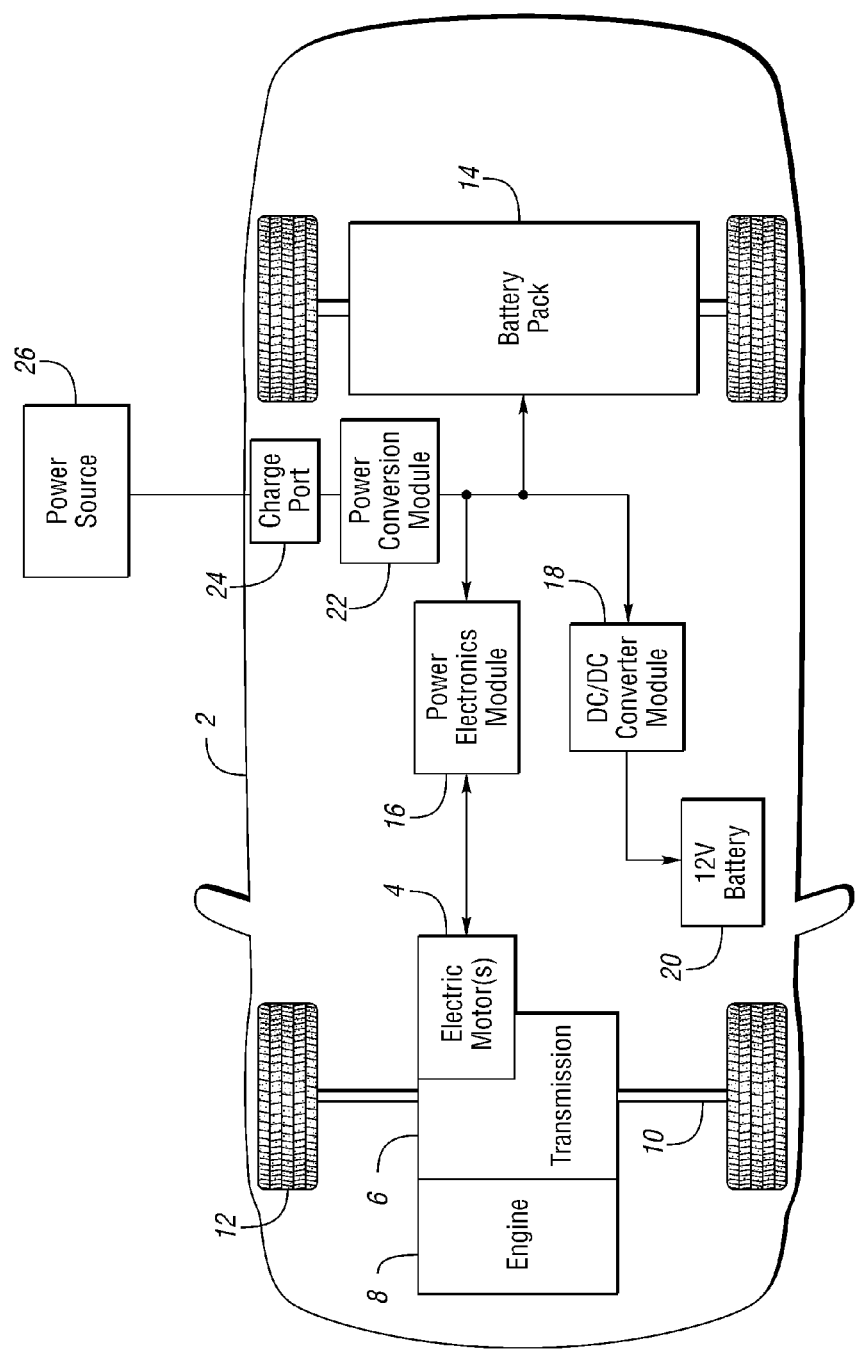
FIG. 1 is a diagram of a hybrid-electric vehicle that illustrates some typical drivetrain and energy storage components in a hybrid-electric vehicle.

FIG. 1 depicts a typical hybrid-electric vehicle. A typical hybrid-electric vehicle 2 may comprise one or more electric motors 4 mechanically connected to a hybrid transmission 6. In addition, the hybrid transmission 6 is mechanically connected to an engine 8. The hybrid transmission 6 may also be mechanically connected to a drive shaft 10 that is mechanically connected to the wheels 12. The electric motors 4 can provide propulsion and deceleration capability when the engine 8 is turned on or off. The electric motors 4 may also act as generators and can provide fuel economy benefits by recovering energy that would normally be lost as heat in the friction braking system. The electric motors 4 may also provide reduced pollutant emissions since the hybrid electric vehicle 2 may be operated in electric mode under certain conditions.

The battery pack 14 stores energy that can be used by the electric motors 4. The battery pack 14 is often referred to as a traction battery. A vehicle battery pack 14 typically provides a high voltage DC output. The battery pack 14 is electrically connected to at least one power electronics module 16. The power electronics module 16 is also electrically connected to the electric motors 4 and provides the ability to bi-directionally transfer energy between the battery pack 14 and the electric motors 4. For example, a typical battery pack 14 may provide a DC voltage while the electric motors 4 may require a three-phase AC current to function. The power electronics module 16 may convert the DC voltage to a three-phase AC current as required by the electric motors 4. In a regenerative mode, the power electronics module 16 will convert the three-phase AC current from the electric motors 4 acting as generators to the DC voltage required by the battery pack 14. The methods described herein are equally applicable to a pure electric vehicle.

In addition to providing energy for propulsion, the battery pack 14 may provide energy for other vehicle electrical systems. A typical system may include a DC/DC converter module 18 that converts the high voltage DC output of the battery pack 14 to a low voltage DC supply that is compatible with other vehicle loads. Other high voltage loads, such as heaters and compressors, may be connected directly without the use of a DC/DC converter module 18. In a typical vehicle 2, the low voltage systems are electrically connected to a 12V battery 20. An all-electric vehicle may have a similar architecture but without the engine 8.

The vehicle 2 may be a plug-in hybrid in which the battery pack 14 may be recharged by an external power source 26. The external power source 26 may provide AC or DC power to the vehicle 2 by electrically connecting through a charge port 24. The charge port 24 may be any type of port configured to transfer power from the external power source 26 to the vehicle 2. The charge port 24 may be electrically connected to a power conversion module 22. The power conversion module 22 may condition the power from the external power source 26 to provide the proper voltage and current levels to the battery pack 14. In some applications, the external power source 26 may be configured to provide the proper voltage and current levels to the battery pack 14 and the power conversion module 22 may not be necessary. The following description applies equally to any vehicle 2 utilizing a battery pack 14.

The various components discussed may have one or more associated controllers (not shown) to control and monitor the operation of the components. The controllers may communicate via a serial bus (e.g., Controller Area Network (CAN)) or via discrete conductors.

Figure 2:
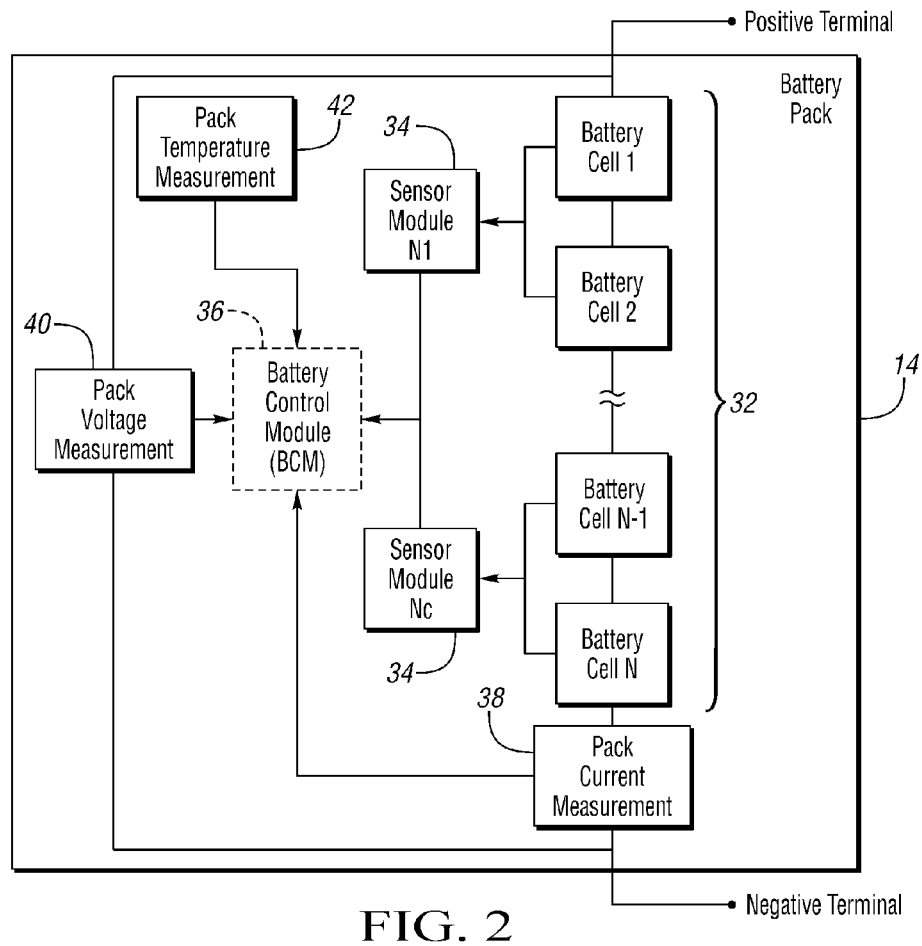
FIG. 2 is a diagram of a possible battery pack arrangement for a pack comprised of multiple cells and monitored and controlled by a Battery Control Module.

A battery pack 14 may be constructed from a variety of chemical formulations. Typical battery pack chemistries are lead acid, nickel-metal hydride (NIMH) or Lithium-Ion. FIG. 2 shows a typical battery pack 14 having a configuration of N battery cells 32 connected in series. A battery pack 14 may be composed of a number of individual battery cells 32 connected in series or parallel or some combination thereof. A typical system may have a Battery Control Module (BCM) 36 that monitors and controls the performance of the battery pack 14. The BCM 36 may monitor several battery pack level characteristics such as pack current 38, pack voltage 40 and pack temperature 42.

In addition to the pack level characteristics, there may be battery cell 32 characteristics that need to be measured and monitored. For example, the open-circuit voltage, current, and temperature of each cell 32 may be measured. A system may use a sensor module 34 to measure the battery cell 32 characteristics. Depending on the capabilities, a sensor module 34 may measure the characteristics of one or multiple battery cells 32. A battery pack 30 may utilize up to $N_c$ sensor modules 34 to measure the characteristics of all the battery cells 32. Each sensor module 34 may transfer the measurements to the BCM 36 for further processing and coordination. The sensor module 34 may transfer signals in analog or digital form to the BCM 36.

During development or during vehicle life, it may be advantageous to have a measure of battery life. Battery properties may change over the life of the battery. Operating strategies that are used early in a battery lifetime may need to be adjusted in response to changing battery characteristics due to aging. A method of determining the amount of degradation in battery life that has occurred may be useful for setting performance limits as the battery ages. It may also be useful as an indication to the vehicle owner that battery service may be required.

Since a battery pack 14 may be subject to degradation over its lifetime, it may be useful to characterize the types of degradation that may occur. Two types of degradation associated with the operation of a battery pack 14 may be considered. The first type of degradation may occur due to storage of the battery. Storage of the battery is a condition where the battery is at rest, that is, no current is being supplied by or to the battery. This type of degradation may be referred to as calendar life degradation or aging. A battery that is stored may degrade over time based on internal processes of the battery.

Another type of battery degradation is caused by cycling of the battery. Cycling of the battery may be defined as when current is supplied from a power source to the battery or delivered to a load by the battery. Power may be provided to the battery pack 14 from the power conversion module 22 or the power electronics module 16. During operation, battery temperatures may be affected by the amount of current flowing through the battery. The temperature of the battery may affect the degradation characteristics. In addition, physical processes within the battery may cause the capacity of the battery to degrade and internal resistance of the battery to increase over time during operation.

There are a variety of battery chemistries that may be used in hybrid and electric vehicles. Each may have different degradation characteristics. There has been great interest in lithium-ion battery packs due to their improved energy storage capability. Degradation of a lithium-ion battery may be caused by several mechanisms, including degradation due to lithium plating and solid electrolyte interface (SEI) layer changes on the anode, conductivity losses in both electrodes, solvent reduction, and chemical and structure changes of the anode, cathode or electrolyte. The mechanisms of degradation are different between resting and cycling and the amount of degradation depends on the temperature, state of charge levels, cycling current, and state of charge range experienced during cycling. The effects of battery degradation may include increased internal impedance and reduced energy storage capacity.

During rest, solvent reduction is an important contributor to calendar life degradation. The SEI layer, whose structure is affected by both cycling and rest conditions, affects the rate of solvent reduction at rest. It is apparent that battery calendar life degradation depends on both the storage history and the cycling history of the battery. Likewise, battery cycling degradation depends on both the cycling history and the storage history of the battery. Based on these observations, a method of accumulating battery degradation may be developed that takes into account these properties.

Figure 3:
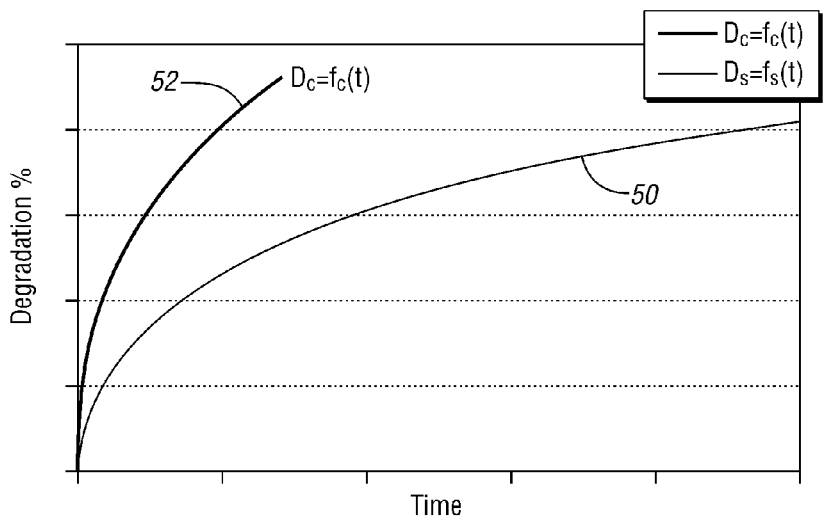
FIG. 3 is a graph of sample degradation profile for cycling and storage conditions.

A degradation profile that defines the accumulated degradation over time may be developed to characterize the battery. Alternatively, a battery resistance profile that defines the accumulate resistance increase over time may be developed. The degradation profile may be expressed as one or more plots or equations. Battery degradation data may be collected during testing to develop the curves or functions. FIG. 3 shows an example battery degradation profile over time for both storage, $D_s$ 50, and cycling, $D_c$ 52, conditions. FIG. 3 is a simple example and in practice there may be additional curves based on different temperatures or some other chosen characteristic. The curves may be developed such that the amount of degradation depends on the time at a given operating condition. The amount of degradation incurred may be determined based on the amount of time at that operating condition. In a cycling condition, the degradation incurred may be determined based on the amount of current throughput or cycle number. Knowing the starting amount of degradation and the elapsed time (or current throughput or cycle number) at that operating condition allows the total amount of degradation to be determined. Test data may also be reduced to equivalent equations that may be more convenient to use in a controller implementation. For description purposes, graphs may be more illustrative of the method to be used.

Figure 4A:
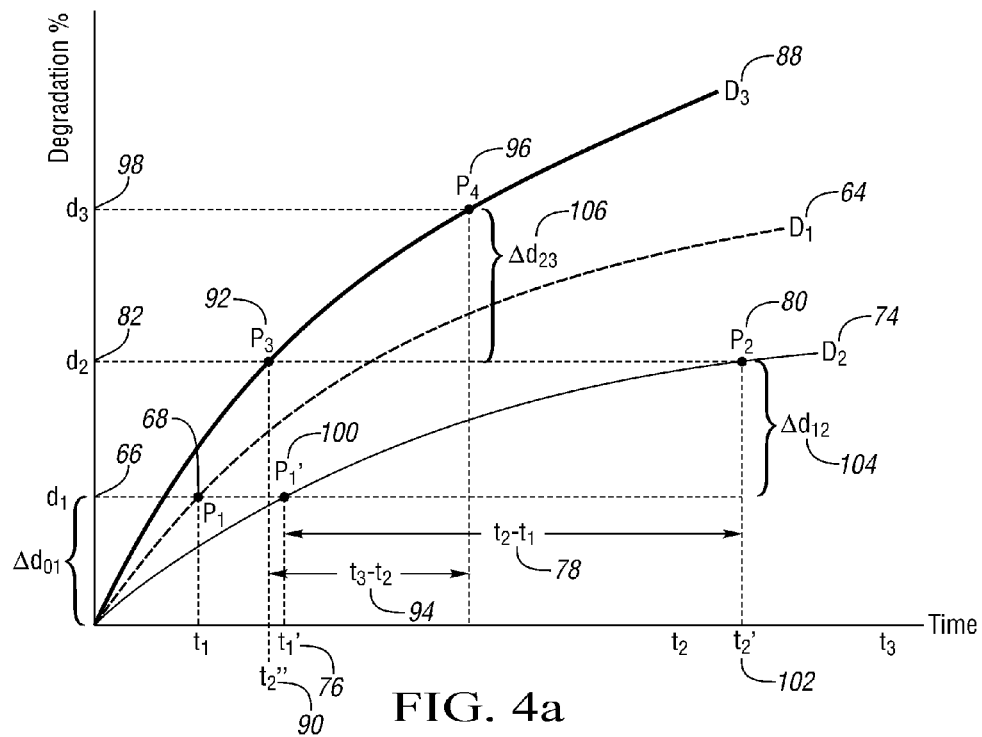
FIG. 4a is a graph depicting a disclosed method using several different storage degradation profiles at different temperatures.
Figure 4B:
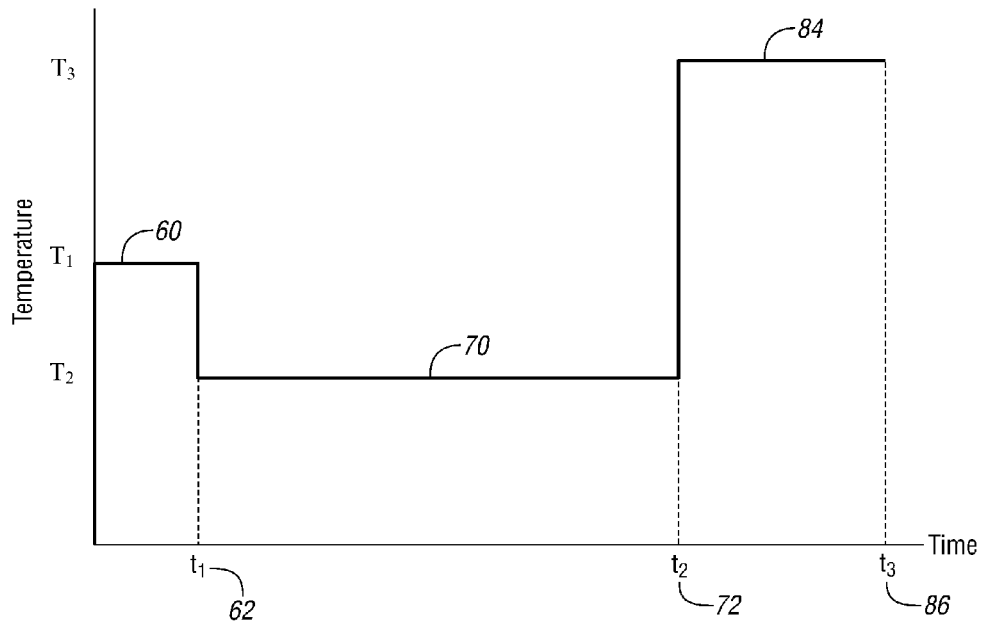

The simpler case is where there is only one type of degradation—storage or cycling. In this case, the degradation profile may be a set of curves or functions based on temperature or other characteristic. As an example, consider that there is a degradation profiles (set of curves or equivalent functions) for storage degradation at different temperatures as shown in FIG. 4a. Alternatively, there may be a set of degradation profiles based on state of charge levels, cycling current, and depth of cycling due to state of charge fluctuations. Also, assume a temperature profile as shown in FIG. 4b. For this example, it is assumed that the starting battery degradation is zero, but this is not necessary. The first step may be to determine the amount of degradation that occurs due to storage at the first temperature, $T_1$ 60. From the temperature profile of FIG. 4b, the amount of time at the first temperature, $T_1$ 60, can be determined as $t_1$ 62. The degradation curve associated with the first temperature, $T_1$ 60, is the curve $D_1$ 64. The amount of degradation caused by storage at the first temperature, $T_1$ 60, for the amount of time, $t_1$ 62, can be determined as $d_1$ 66 at the point $P_1$ 68. Up to this point, the battery has accumulated degradation in the amount of $d_1$ 66.

At time $t_1$ 62, the temperature changes to $T_2$ 70 and remains at that temperature until time $t_2$ 72. This means that curve $D_2$ 74 of FIG. 4a is now applicable to determine degradation during this period. In order to find the correct amount of degradation incurred at the temperature $T_2$ 70, the starting point on curve $D_2$ 74 must be determined. In order to find the starting degradation amount, the currently accumulated degradation value, $d_1$ 66, may be used. The starting point may be the point on $D_2$ 74 where there is degradation in the amount of $d_1$ 66. This point, $P_1'$ 100, is shown on FIG. 4a as occurring at time $t_1'$ 76. The battery may be at temperature $T_2$ 70 for the time between $t_2$ 72 and time $t_1$ 62. To find the amount of additional degradation incurred, the point on curve $D_2$ 74 that is an amount of time $t_2-t_1$ 78 from $t_1'$ 76 may be determined. This may be at point $P_2$ 80 at time $t_2'$ 102 at which time the accumulated degradation is $d_2$ 82. The increment to the accumulated degradation from $t_1$ 62 until $t_2$ 72 may be $\Delta d_{12}$ 104.

At time $t_2$ 72, the temperature changes to $T_3$ 84 and remains there until time $t_3$ 86. At this temperature, curve $D_3$ 88 applicable. The correct starting point on $D_3$ 88 may be determined. The starting point on $D_3$ 88 may be the point at which there is $d_2$ 82 accumulated degradation. This occurs at time $t_2''$ 90 as indicated by point $P_3$ 92. The time at this temperature may be determined by subtracting time $t_2$ 72 from time $t_3$ 86. The amount of degradation may be found by finding the point on $D_3$ 88 that is $t_3-t_2$ 94 away from $t_2''$ 90 which is point $P_4$ 96 at which there is an accumulated degradation of $d_3$ 98. The increment to the accumulated degradation from $t_2$ 72 until $t_3$ 86 may be $\Delta d_{23}$ 106.

This process may be continually repeated at different temperatures to determine the accrued amount of storage degradation. The example is presented graphically but the curves may be approximated by functions and the process may be performed using the mathematical functions. Expressing the curves as functions may allow more effective implementation in a controller. The incremental degradation is a function of the time at the temperature and the starting time is a function of the previous accumulated degradation.

To summarize, the method involves estimating the degradation due to the time at each temperature. As temperature changes, the starting point on the curve corresponding to the temperature may be adjusted to reflect the total accumulated degradation. This adjusts the starting time for the current temperature.

The number of curves or functions may vary. One implementation may be to have curves for two extreme temperature values. Values in between may be interpolated between the two curves. As the number of defined temperature curves increases, interpolation between adjacent curves may still be utilized to represent temperature values for which there is no defined curve.

Figure 5:
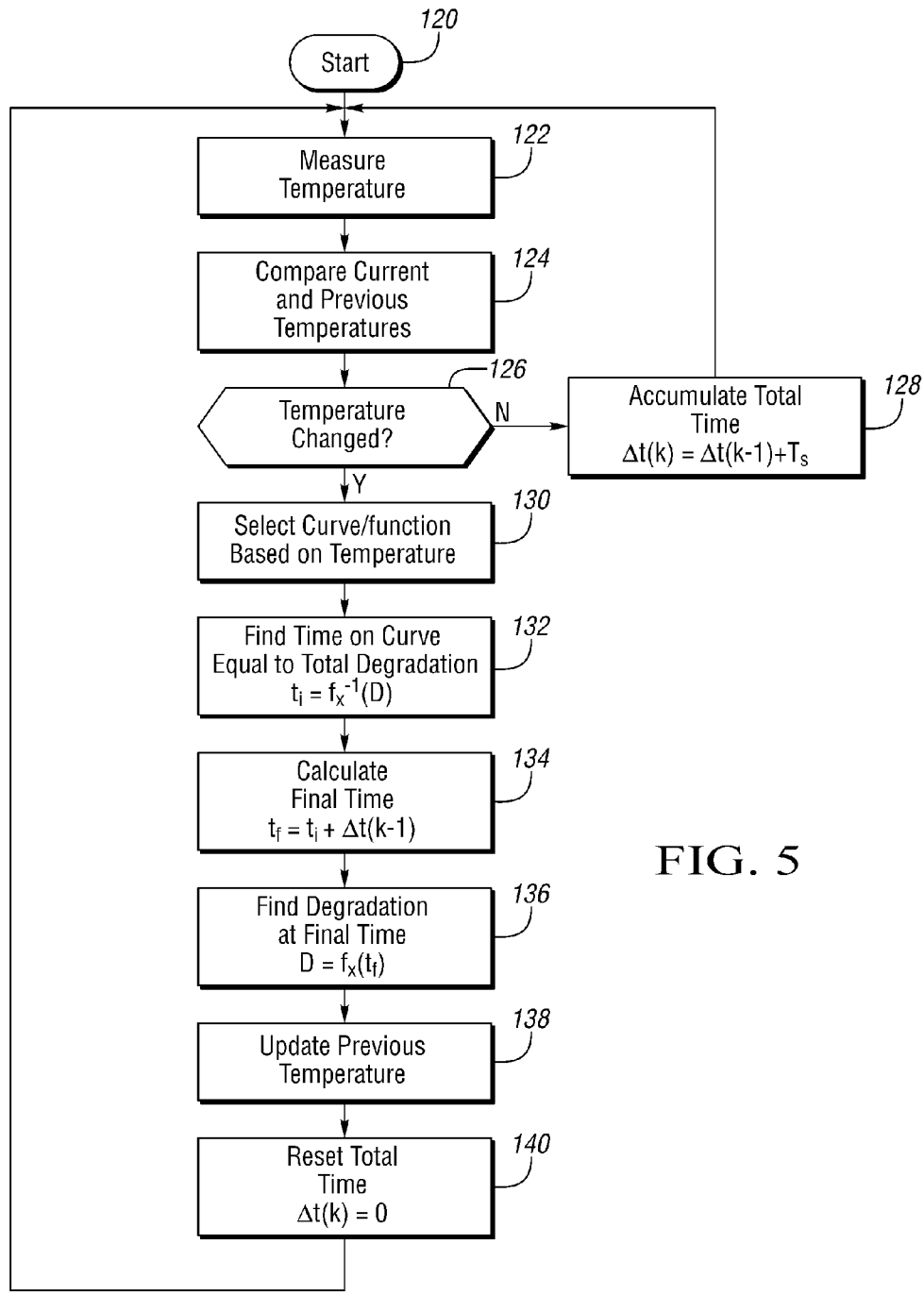
FIG. 5 is a flowchart showing a general algorithm that may be used to determine degradation at same operating condition with varying temperature.

FIG. 5 shows one possible embodiment of the method where only one type of operating condition is present. The method may begin by measuring the present temperature $T_i$ 122 of the battery pack. The present temperature, $T_i$, may be compared to a previously measured temperature, $T_p$ 124. A comparison may be performed to see if the temperature has changed 126. Note that exact equivalence may not be necessary. The temperatures may be compared to see if they are within a specified range of one another. The resolution of a temperature change may depend on the number of curves or functions that are being used. If the temperature has not changed, a time accumulator, $t_{total}$, may be incremented that reflects the time between samples 128. The temperature measurement 122 process may then be repeated until a change in temperature is detected.

If the temperature has changed, the degradation due to the previous temperature may be calculated. The proper curve or function at the previous temperature must be selected 130.

Assume that there are n degradation functions or curves defined denoted as $f_n(t)$. The appropriate time on the selected curve based on the previously accumulated degradation must be determined 132. If a function is used, an initial time, $t_i$, may be determined based on $f_n^{-1}(D_{total})$ The next step may be to determine a final time, $t_f$, by adding the accumulated time, $t_{total}$, to the initial time, $t_i$ 134. Next, the degradation value on the selected curve at the time, $t_f$, may be determined as $f_n(t_f)$ 136. This yields the total degradation up to the present time. The previous temperature value may then be updated to the latest temperature value 138 and the total time, $t_f$, may be reset to zero 140. The process of measuring temperature 122 may then be repeated.

The above described method may work well for long periods in a storage state where a controller may not be running to monitor the degradation. However, other implementations may be more desired during time periods in which the controller is operating. Alternatively, it may not necessary to wait for a change in temperature to accumulate the degradation. Degradation may be accrued incrementally over a sampling interval at the current temperature. The steps for accruing degradation remain the same but the duration of time may be smaller.

The prior analysis only considers one operating condition, in this case, for storage of the battery. A more practical method may consider both storage and cycling conditions. In the case of both storage and cycling conditions, there are degradation characteristics for both operating conditions. Accumulating the degradation for both cycling and storage conditions may require that degradation be separately accumulated for both operating conditions. As discussed earlier, storage degradation has some impact on cycling degradation. However, only a portion of the storage degradation impacts the cycling degradation. Likewise, some percentage of the cycling degradation impacts the storage degradation. This means that the total accumulated degradation is not purely the sum of separately accumulated cycling and storage degradation.

Figure 6:
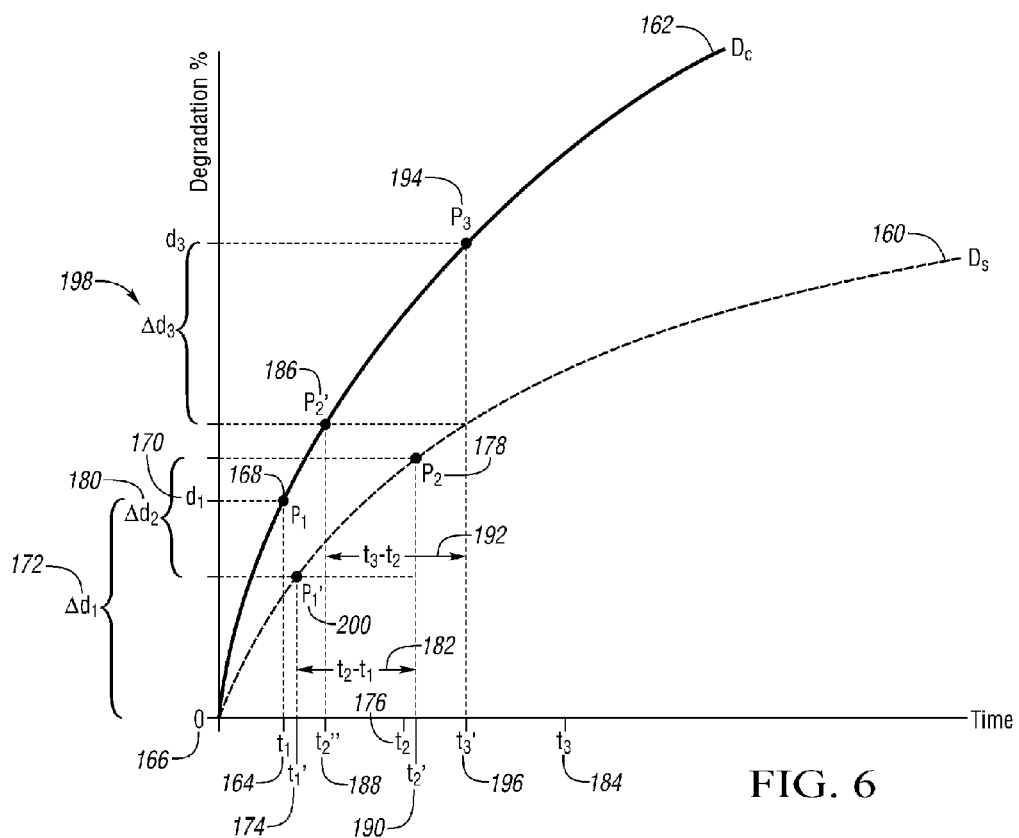
FIG. 6 is a graph depicting a disclosed method when the battery changes between different operating conditions.

FIG. 6 shows example accumulated degradation profiles for storage, $D_s$ 160, and cycling, $D_c$ 162. During normal operation, the battery may alternately operate under periods of cycling and storage. Similar to the previous example of operation in only one operating condition, calculating the total accumulated degradation may involve finding the appropriate starting time on the new curve when transitioning between the curves. The method to be described attempts to separate the degradation due to cycling and the degradation due to storage. The accumulated degradation due to each operating condition is used when switching between operating modes to determine the starting point for determining the additional degradation. Degradation incurred during each operating mode is accumulated to calculate a total degradation for the battery. Note that other modes of degradation may be defined and the system described may be extended to more than two operating modes.

The method begins by determining the current operating mode. The operating modes considered may be cycling or storage. For example purposes, assume that the battery is starting at zero degradation and is initially in a cycling mode. In a cycling mode, the cycling curve, $D_c$ 162, may be the relevant degradation profile. Assume that the battery remains in the cycling mode for a time $t_1$ 164. Starting at the initial degradation 166, zero in this case, the degradation at time, $t_1$ 164, may be found to be the point $P_1$ 168 on the $D_c$ curve 162. The point $P_1$ 168 corresponds to a degradation of $d_1$ 170. This amount, $d_1$ 170, may be added to the total accumulated degradation. The change in degradation caused by operating under this condition is shown as $\Delta d_1$ 172 and may be derived from the difference between the degradation $d_1$ 170 and the degradation at the previous point, zero 166 in this case. In addition, this amount may also be added to an accumulated value that may be referred to as the pseudo cycling degradation. The pseudo cycling degradation represents the accumulated amount of degradation incurred due to cycling of the battery.

In a similar manner, a value of accumulated pseudo calendar degradation may be maintained. As described earlier, the cycling degradation may have some impact on the calendar degradation. To account for this effect, a percentage of the cycling degradation may be added to the pseudo calendar degradation. The percentage of cycling degradation that is carried over to the calendar life degradation may be represented by a factor β. At the end of this first cycling period, there may be an accumulated total degradation of $d_1$, a pseudo cycling degradation of $d_1$, and a pseudo calendar degradation of $β*d_1$ as shown in Table 1.

Next assume that the battery operating condition transitions to a rest or storage period. The additional degradation during this time may now be determined using the curve $D_s$ 160. In order to determine the starting point on the $D_s$ curve 160, the pseudo calendar degradation may be used. The current value of the pseudo calendar degradation may be $β*d_1$. The point at which this occurs may be at $P_1'$ 200 at time, $t_1'$ 174 on the $D_s$ curve 160. This time, $t_1'$ 174, may be used as the starting time for the accumulation of the storage degradation. Assuming that the battery is at rest until time $t_2$ 176, the degradation incurred during this rest period may be the amount of degradation on the curve over a time $t_2-t_1$ 182 starting from time $t_1'$ 174. The point on the curve that is $t_2-t_1$ 182 away from $t_1'$ 174 on the $D_s$ curve 160 may be labeled $P_2$ 178 at time $t_2'$ 190. The degradation added to the total accumulated degradation may be an amount $\Delta d_2 = d_2 - β*d_1$ 180. The incremental degradation may be the difference between the degradation at the ending point, $P_2$ 178, and the degradation at the starting point, $P_1'$ 200. The amount of degradation added to the pseudo calendar degradation may also be $\Delta d_2 = d_2 - β *d_1$ 180.

A percentage of the calendar degradation may now be added to the pseudo cycling degradation. The percentage may be represented by a factor γ. The pseudo cycling degradation may define the starting point for the degradation determination on the curve $D_c$ 162. Note that the total degradation accumulates all the degradations incurred from both storage and cycling. The pseudo cycling and pseudo storage degradations may differ from the total accumulated degradation. In this example, the amount of degradation added to the pseudo cycling degradation will be $γ(\Delta d_2)$. The degradation added to each accumulated degradation value is summarized in Table 1. In addition, the sum of the pseudo cycling degradation and the pseudo storage degradation does not equal the total degradation.

Now assume that from time $t_2$ 176 until time $t_3$ 184 that the battery is cycling again. The effective curve may once again be the cycling curve $D_c$ 162. To find the degradation during this time, the starting point on the curve may be determined. To find the starting point, the pseudo cycling degradation value may be used. The amount of degradation corresponding to the pseudo cycling degradation may be found on the $D_c$ curve 162 to be the point $P_2'$ 186. This may occur at a time of $t_2''$ 188. The amount of degradation that is incurred between $t_2$ 176 and $t_3$ 184 may be determined. This means that the point on the $D_c$ curve 162 that is $t_3-t_2$ 192 time away from $t_2''$ 188 may be the final amount of cycling degradation. This occurs at point $P_3$ 194 at time $t_3'$

196. During this time, $\Delta d_3$ 198 amount of degradation may be added to the total accumulated degradation and the pseudo cycling degradation. An amount of $\beta(\Delta d_3)$ may be added to the pseudo storage degradation.

The process may be repeated for alternating periods of storage and cycling. The amount of degradation at each operating condition may be added to the total accumulated degradation value to indicate the amount of degradation incurred up to the present time. A portion of the degradation incurred may be added to the pseudo degradation value for the other operating conditions. Table 1 shows the accumulation of the degradation values for the example.

TABLE 1

Example of Accumulating Degradation Values.

| Time | Total Degradation | Pseudo Cycling Degradation | Pseudo Storage Degradation |
|---|---|---|---|
| t0 | 0 | 0 | 0 |
| t1 | $\Delta d_1$ | $\Delta d_1$ | $\beta(\Delta d_1)$ |
| t2 | $\Delta d_1 + \Delta d_2$ | $\Delta d_1 + \gamma(\Delta d_2)$ | $\beta(\Delta d_1) + \Delta d_2$ |
| t3 | $\Delta d_1 + \Delta d_2 + \Delta d_3$ | $\Delta d_1 + \gamma(\Delta d_2) + \Delta d_3$ | $\beta(\Delta d_1) + \Delta d_2 + \beta(\Delta d_3)$ |
| ... | ... | ... | ... |

Graphically using the curves illustrates the method for accumulating degradation, but a more practical embodiment may use functions derived from the curves. Using a function for the curves, $D_c$ 162 and $D_s$ 160, a mathematical solution may be derived. In the example presented, the curves may be defined as a function of time, $D_s=f_s(t)$ and $D_c=f_c(t)$. The inverse of each function may also be necessary such that the time values can be derived from $f_s^{-1}(D_s)$ and $f_c^{-1}(D_c)$. Applying these equations to the previous example, the degradation at time $t_1$ 164 may be determined to be $\Delta d_1=f_c(t_1)$ 172. The calculation for accumulating total degradation and the pseudo degradations may then performed as described previously.

At time $t_1$ 164 until time $t_2$ 176, the system is in storage mode so that the function for $D_s$ 160 may be utilized. The time, $t_1'$ 174 at which degradation may be started may be determined from the function as $t_1'=f_s^{-1}(\beta \Delta d_1)$. The degradation incurred during this storage cycle may be found to be $\Delta d_2=f_s(t_1'+(t_2-t_1))-f_s(t_1')$ 180. This amount, $\Delta d_2$ 180, may then be added to the total accumulated degradation and the pseudo storage degradation. An amount of $\gamma(\Delta d_2)$ may be added to the pseudo cycling degradation.

From time $t_2$ 176 until time $t_3$ 184, the system is in cycling mode again so that the function $D_c$ 162 may be used. The time $t_2''$ 188 at which the degradation calculation is to be started can be found as $t_2''=f_c^{-1}(\Delta d_1+\gamma(\Delta d_2))$ 188. The degradation incurred during cycling can be found to be $\Delta d_3=f_c(t_2''+(t_3-t_2))-f_c(t_2'')$ 198. This amount, $\Delta d_3$ 198, may then be added to the total accumulated degradation and the pseudo cycling degradation. An amount of $\beta(\Delta d_3)$ may be added to the pseudo storage degradation. This alternating process may be repeated continuously in order to track the total degradation of the battery.

Figure 7:
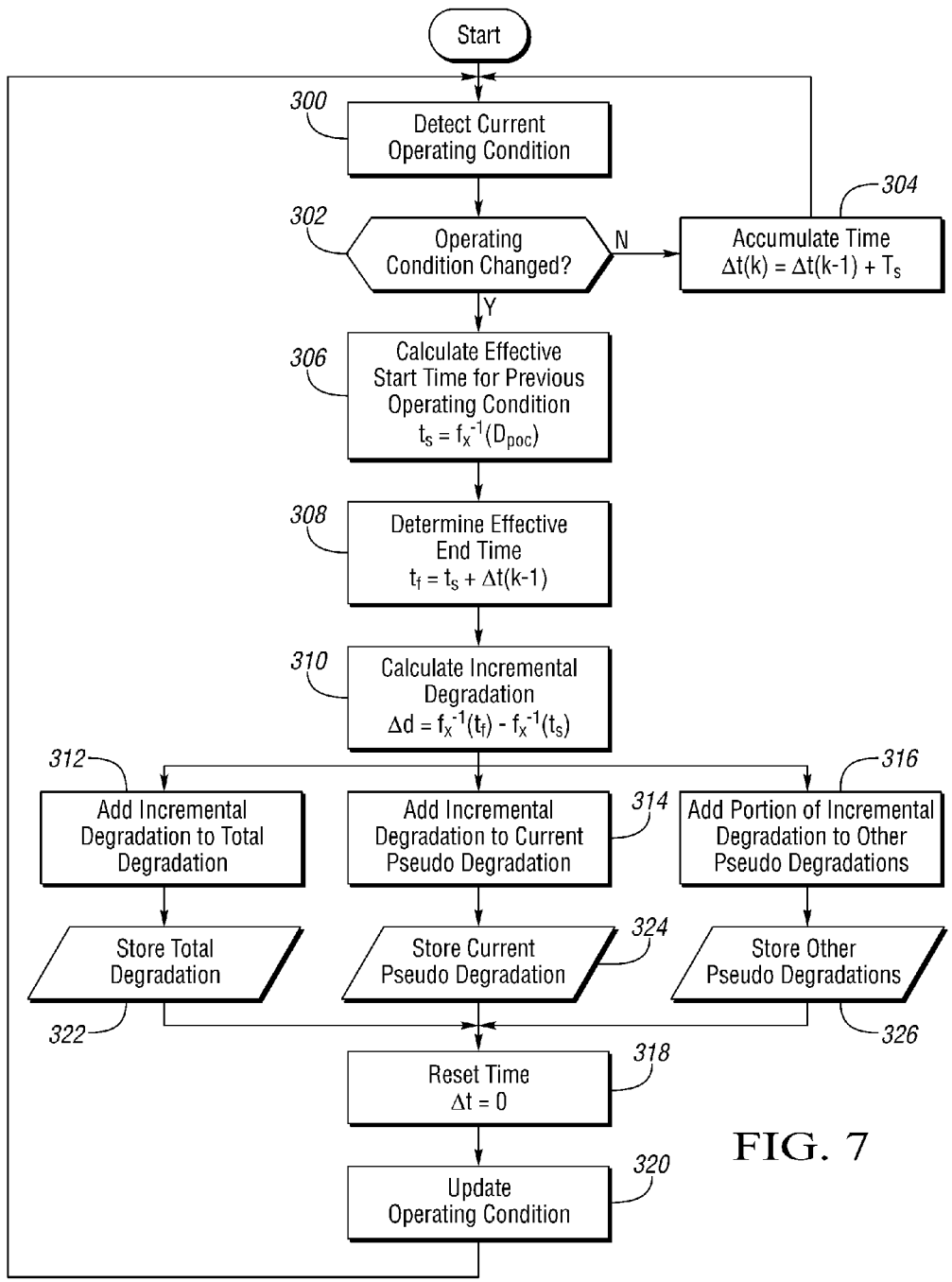
FIG. 7 is a flowchart showing a general algorithm that may be used to determine degradation when moving between different operating conditions.

The flowchart of FIG. 7 depicts an example of the method to accumulate the battery degradation over time. The method may initially detect the current operating condition 300. The earlier example considered only two operating conditions, cycling and storage, but other operating conditions may be possible. The operating conditions may also include operation at different temperatures, state of charge levels, state of charge fluctuation ranges, or cycling currents. Once the current operating condition has been ascertained, a comparison may be made to determine if the operating condition has changed from the previous sample 302. If there is no change in the operating condition, a time counter may be incremented 304 to reflect the total time at the current operating condition. An amount equal to the sampling time ($T_s$) may be added to the time counter, such that $\Delta t(k)=\Delta t(k-1)+T_s$.

If the operating condition has changed, the degradation due to the previous operating condition may be determined. The effective start time at the operating condition may be calculated 306 from the current pseudo accumulated degradation at the previous operating condition. This may be determined from the function as $t_s=f_x^{-1}(D_{poc})$, where $D_{poc}$ is the pseudo accumulated degradation for the present operating condition. The effective ending time at the current operating condition may then be calculated 308. This may be accomplished by adding the total time at the operating condition, $\Delta t(k-1)$, to the effective start time, $t_s$, such that, $t_f=t_s+\Delta t(k-1)$. Note that the previous time at sample interval $k-1$ is used since at the current sample interval, k, the time may not be updated because the operating condition has changed.

The incremental battery degradation due to operating under the previous operating condition may then be calculated 310. The incremental battery degradation may be that amount of degradation that occurred at the previous operating condition from the effective starting time to the effective ending time. This may be calculated as $\Delta d=f_x(t_f)-f_x(t_s)$, where $f_x$ represents the degradation curve or function at the previous operating condition.

The incremental battery degradation, $\Delta d$, may be added to the total degradation 312 and stored for later use 322. The incremental battery degradation, $\Delta d$, may also be added to the pseudo degradation value for the previous operating condition 314 and stored for later use 324. A portion of the incremental battery degradation, $\beta \Delta d$ or $\gamma \Delta d$, may be added to the pseudo degradation value for operating condition other than the previous operating condition 316 and stored for later use 326. The portion of the incremental battery degradation added may depend on the pseudo degradation value that is being updated. Depending on the system, the accumulated degradation values may be stored in non-volatile memory so that the values may be available even during power-off conditions.

The time counter, $\Delta t$, may be reset to zero 318 so that time may be accumulated for the current operating condition. The previous operating condition may be updated to the current changed operating condition 320 for later comparison. Finally, the process may be repeated during the next sample time by detecting the operating condition 300. In this manner, the battery degradation may be accumulated over the life of the battery. It should be noted that FIG. 7 is merely one possible embodiment of the method and other embodiments are possible.

An alternative method of calculating the pseudo degradations may be to separately maintain the sum of the degradation due to each operating condition. When switching to a different operating condition, the starting degradation may be the accumulated pseudo degradation at the new operating condition plus a percentage of the accumulated pseudo degradation of the other operating condition. The additional degradation calculated may then be added to the total degradation and to the pseudo degradation for the new operating condition.

Additionally, the pseudo degradations may be calculated periodically and not just when the operating condition has changed. This may require more execution time but may lead to a more frequent update of the degradations. The method to follow is similar and the result may be the same.

It must be noted that the example only used two curves to demonstrate the method. In practice, there may be multiple curves for the storage and cycling degradation. The different curves may be due to different operating or storage temperatures, state of charge levels, cycling currents, and depth of state of charge fluctuations. The method would work similarly and the proper curves may be selected based on the current battery temperature.

The degradation transfer factors β and γ may be determined from experimental data or derived from battery physics and chemistry. These factors may not be constant and may vary as the battery ages. It may be desirable to use variable factors to compensate for changes due to different factors over time.

Once the accumulated battery degradation is determined, it may be used to determine the useful life remaining for the battery. A threshold may be selected for determining when the useful life of the battery has expired. This threshold may be determined from experimental data and may indicate a time where the battery cannot effectively perform its intended function. The degradation amount may also be used to provide a service indicator. For example, a service indication may be directed toward the driver to indicate that the battery may not be capable of performing at a high level.

Additionally, the degradation amount may be provided to the other control functions. The degradation amount may affect the battery state of charge determination. The degradation amount may be transferred to the state of charge logic in order to calculate a more accurate state of charge when the battery is degraded. The degradation amount may also be used by the battery thermal controls to determine an effective thermal strategy under degraded conditions. Finally, battery model parameters may be adjusted based on the degradation.

The above examples utilized curves and function related to accumulated capacity decay over time. The methods described can work with curves and functions that accumulate the battery resistance changes over time.

The method may be performed by a controller offline or in real-time depending on the required application. An offline controller may use the method to process measured data and analyze the battery degradation. A real-time controller may both measure and process the data to generate the battery degradation for control and display purposes. The accumulated and pseudo degradation values may be stored in non-volatile memory for later use. The method may be executed off-line as a battery life simulation to investigate the effect of various parameter changes.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a traction battery subject to alternating storage and cycling modes; and
at least one controller programmed to operate the traction battery according to a parameter representing total degradation of the traction battery, wherein, in response to a transition between modes, the parameter increases in value according to a degradation profile associated with the present mode starting from an initial degradation value that depends on accumulated degradation for the prior mode.

2. The vehicle of claim 1 wherein the degradation profile defines degradation accumulated over time.

3. The vehicle of claim 1 wherein the initial degradation value is a sum of accumulated degradation for the present mode and a fraction of accumulated degradation for the prior mode.

4. The vehicle of claim 3 wherein the fraction is different for the storage and cycling modes.

5. The vehicle of claim 3 wherein the fraction is based on accumulated degradation for the present mode.

6. The vehicle of claim 1 wherein the degradation profile is traction battery temperature dependent.

7. The vehicle of claim 1 wherein the parameter increases when transitioning between modes.

8. The vehicle of claim 1 wherein the parameter increases periodically.

* * * * *